United States Patent [19]

Rickert

[11] 4,212,211

[45] Jul. 15, 1980

[54] PARKING BRAKE LEVER ASSEMBLY

[75] Inventor: William Rickert, LaSalle, Mich.

[73] Assignee: Donovan Wire & Iron Company, Toledo, Ohio

[21] Appl. No.: 925,453

[22] Filed: Jul. 17, 1978

[51] Int. Cl.² ............................................. G05G 5/18
[52] U.S. Cl. ..................................................... 74/538
[58] Field of Search ................... 74/535, 536, 537, 538

[56] References Cited

U.S. PATENT DOCUMENTS

| | | | |
|---|---|---|---|
| 1,983,192 | 12/1934 | Saunders | 74/536 |
| 2,082,776 | 6/1937 | Blake | 74/536 |
| 3,580,104 | 5/1971 | Yashiro | 74/535 |

*Primary Examiner*—Andrew V. Kundrat

*Attorney, Agent, or Firm*—Wilson, Fraser, Barker & Clemens

[57] ABSTRACT

A hand-actuated parking brake lever assembly is disclosed generally comprising an anchored ratchet plate, a lever mechanism, and a handle. The handle and lever mechanism are pivotally mounted to the ratchet plate, and arranged such that operation of the handle results in pivoting of the lever mechanism and application of the brakes. A pawl is pivotally mounted to the lever mechanism and is biased against a toothed sector of the ratchet plate such that the pawl and sector are locked in engagement during application of the brakes and the braking force is thereby maintained. The handle is returnable to the non-operating position without disengagement of the pawl and sector, but includes a release means for causing such disengagement when it is desired.

4 Claims, 4 Drawing Figures

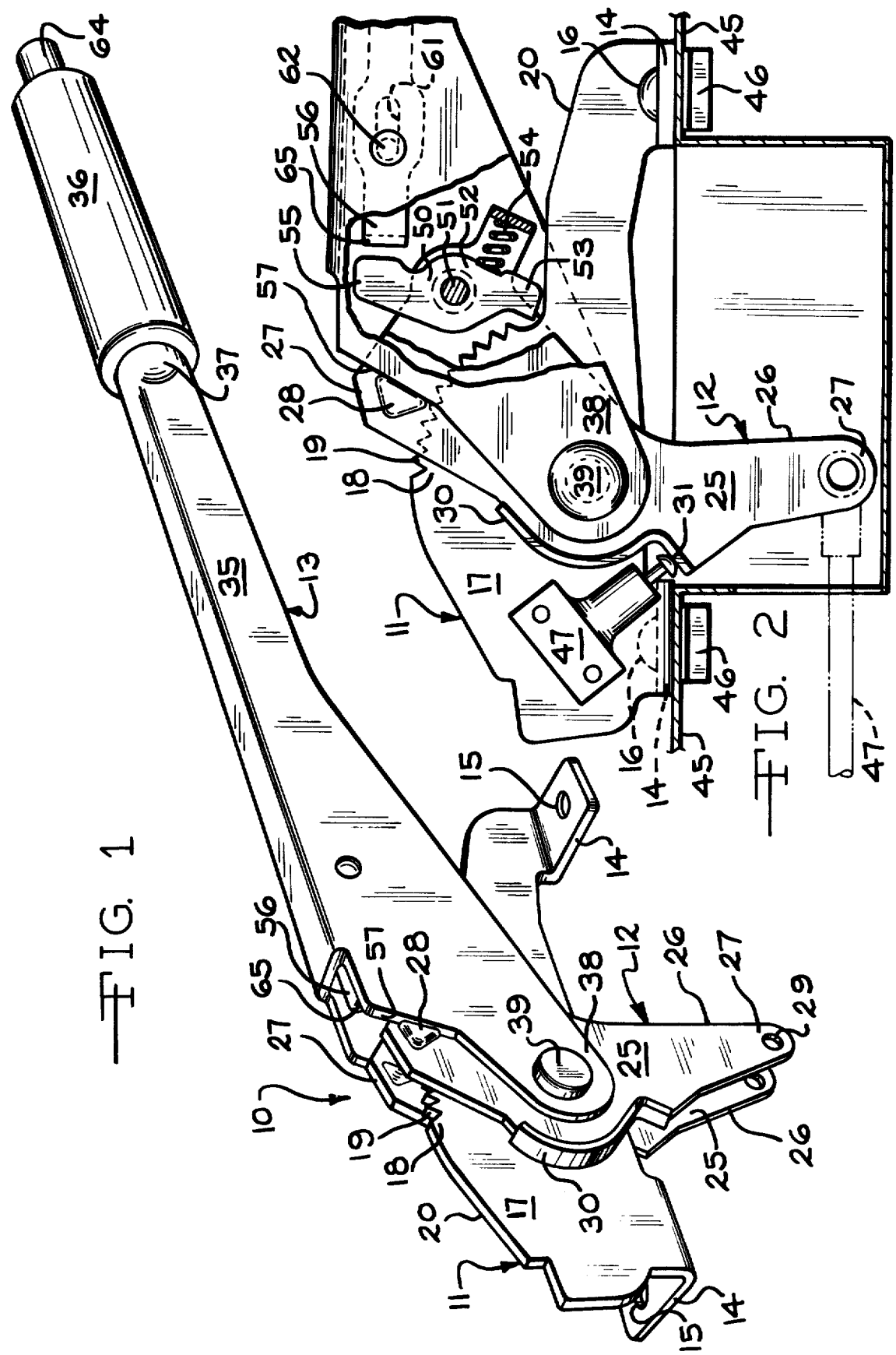

PARKING BRAKE LEVER ASSEMBLY

BACKGROUND OF THE INVENTION

The present invention relates to parking brake lever assemblies, and more specifically to hand-actuated assemblies which are intended for motor vehicle use.

Conventional hand-actuated parking brake assemblies include a long operating handle which projects into the passenger space of the vehicle, a factor which limits its use to and placement in certain vehicles. For example, in automobiles with bench type front seats, placement of a hand brake is essentially limited to the door side of the driver's seat. In such a case, protrusion of a brake handle presents an annoying obstacle to entering and exiting the car and, for that reason, those cars generally incorporate foot-operated parking brake assemblies.

Vehicles with bucket seats in the front have the option to place the hand brake assembly between the driver and passenger seats. In that case, however, the assembly occupies space which could otherwise be used for accessories.

SUMMARY OF THE INVENTION

The present invention is a hand-actuated parking brake assembly with a handle which retracts to its horizontal position when the brake is applied. A preferred embodiment of the assembly generally comprises an anchored ratchet plate having a sector of teeth, a lever mechanism, and a retractable handle.

The lever mechanism and retractable handle are pivotally mounted to the ratchet plate, but are otherwise structurally independent from each other. The lever mechanism includes a stop member and a means for mechanical linkage to a remote brake, such that operation of the handle results in abutting engagement with the stop member thereby pivoting the lever mechanism and applying the brake.

The lever mechanism also includes a pivotally mounted pawl which is biased against the toothed sector of the ratchet plate. Pivoting of the lever mechanism results in engagement between the pawl and toothed sector thereby locking the lever mechanism in a selected posture and maintaining the braking force associated therewith.

The handle is freely retractable to its original non-operating position without disengagement of the pawl and toothed sector and release of the braking force. However, the handle includes a release mechanism for disengaging such pawl and sector when desired, such that the lever mechanism is returned to a non-braking position and the braking force is relieved.

It is therefore an object of the present invention to provide a hand-actuated parking brake assembly with a handle which is retractable during brake application.

It is also an object of the present invention to provide a hand-actuated parking brake assembly with a handle which is retractable during brake application.

It is also an object of the present invention to provide a hand-actuated parking brake assembly which is placeable adjacent an exit of a motor vehicle but which does not obstruct such exit.

Other advantages and objects of the invention will become apparent to persons skilled in the art in view of the following description of a preferred embodiment.

BRIEF DESCRIPTION OF THE DRAWINGS

FIG. 1 is an overall schematic of a preferred embodiment of a hand-actuated parking brake lever assembly in accordance with the present invention;

FIG. 2 is a perspective and partial broken-out section of the embodiment in FIG. 1 in the non-operating position;

DETAILED DESCRIPTION OF THE DRAWINGS

Figure 3:
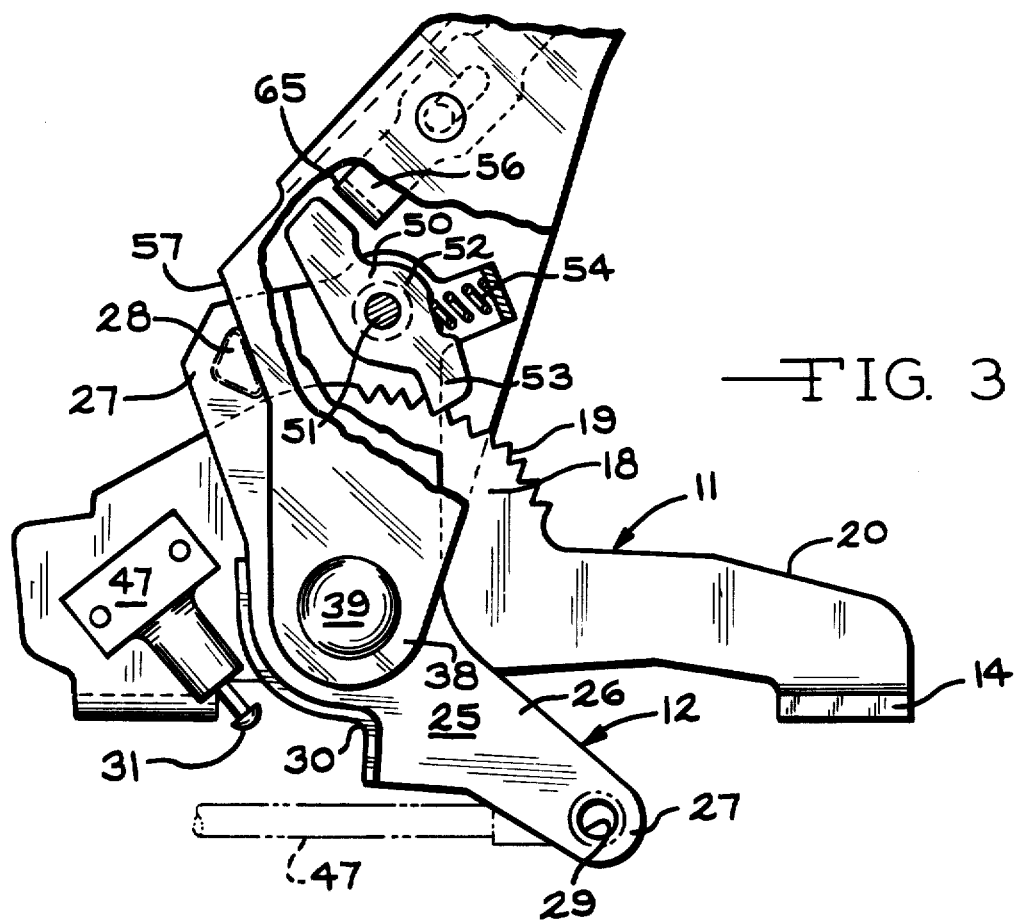
FIG. 3 is a perspective and partial broken-out section of the embodiment in FIG. 1 illustrating the handle and lever mechanism in a brake-applying position.

In FIG. 1 is illustrated a preferred embodiment of a hand-actuated parking brake lever assembly 10 in accordance with the present invention, generally comprising a ratchet plate 11, a lever mechanism 12, and a handle 13.

The ratchet plate 11 includes mounting flanges 14 having holes 15 therethrough for mounting bolts 16, and a vertically disposed main body 17 having a sector 18 of teeth 19 about an upper portion of its periphery 20. A hole (not shown) through the main body 17 provides a location for pivotally mounting the lever mechanism 12 and handle 13.

The lever mechanism 12 includes a bifurcated brake-operating lever 25 saddled over the main body 17 of the ratchet plate 11, each branch 26 of the lever 25 having a hole (not shown) through its center for pivotal mounting upon the ratchet plate 11. At opposite ends 27 of the lever 25 are a stop member 28 and brake cable attachment holes 29, respectively. A strike plate 30 circumscribes a portion of one of the branches 26 for engagement with a signal switch 31, as explained below.

The handle 13 includes an arm 35, a hand grip 36 at one end 37, and a hole (not shown) through the other end 38 for pivotal mounting upon the ratchet plate 11 with the lever 25. The ratchet plate 11, lever 25, and handle 13 are pivotally secured together by means of a pin 39 passing through each.

The assembly 10 is shown in its non-operating, or non-braking, position in FIG. 2. The flanges 14 of the ratchet plate 11 are secured to a vehicle frame 45 by means of mounting bolts 16 extending through each and fastened by nuts 46. A biased-on signalling means 47 is assembled to the plate 11 in such a manner that the switch 31 lies adjacent the strike plate 30 and registers an off signal when the lever 25 is in a non-braking position, but otherwise signals to the driver that the brake is in application. Such signals are very common in the industry, and may employ either light or sound to attract the vehicle operator's attention to the operating status of the assembly. Since the assembly 10 in FIG. 2 is in the non-operating position, the signal switch 31 is off and the tension in brake cable 47 is relieved.

The lever mechanism 12 also includes a pawl 50 mounted thereon about a pivot pin 51 extending through a center portion 52 of the pawl 50. The pawl 50 has a first end 53 which is biased against the periphery 20 of the ratchet plate 11 by means of an abutting compression spring 54. A second end 55 of the pawl 50 lies adjacent a push rod 56 when the shoulder 57 of the handle 13 abuts the stop member 28 of the lever 25.

In order to apply the brakes, the handle 13 is manually raised, as shown in FIG. 3, such that the shoulder 57 abuts the stop member 28 and pivots the lever 25 about the pin 39. Pivoting the lever 25 places the brake cable 47 in tension, and engages the first end 53 of the pawl 50 with the teeth 19 of the ratchet plate sector 18. Furthermore, the strike plate 30 is removed from contact with the switch 31 which then extends into its on position.

Figure 4:
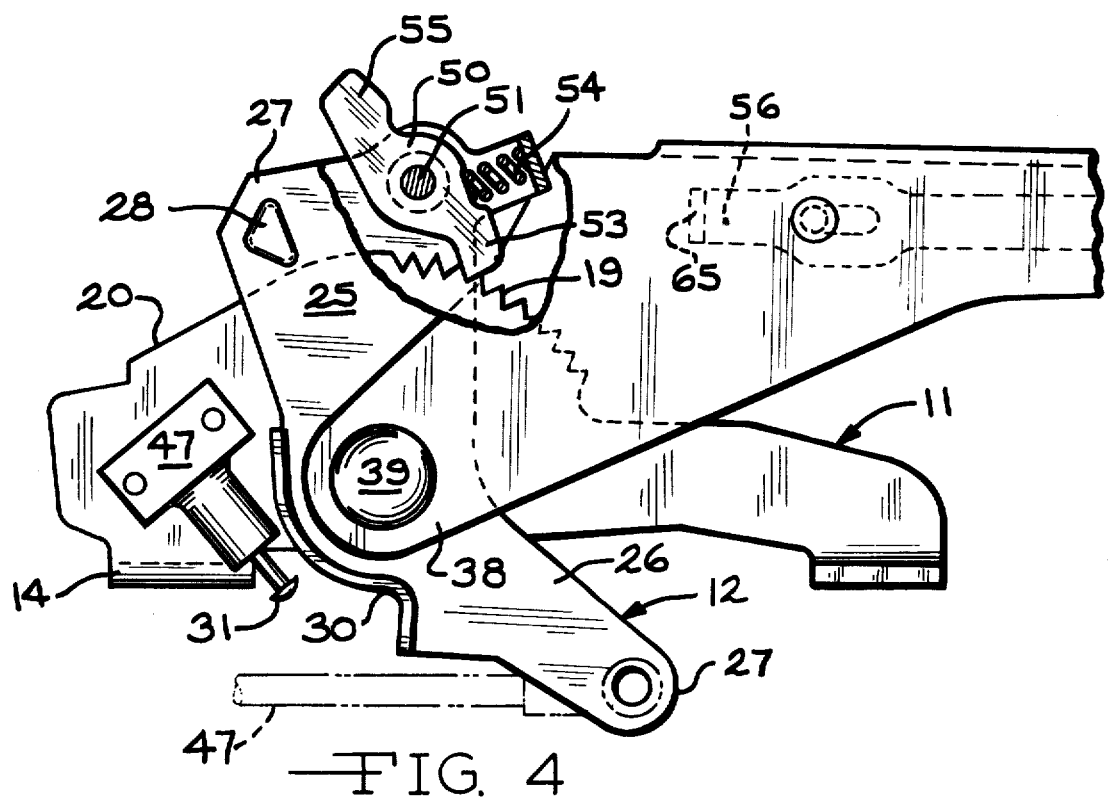
FIG. 4 is a perspective and partial broken-out section of FIG. 3 illustrating the return of the handle to its non-operating position while the brakes remain in application.

Once the brake is applied, the handle 13 is removable to its original horizontal, or non-operating posture, as shown in FIG. 4. The first end 53 of the pawl 50 remains in biased engagement with the sector teeth 19, thereby locking the brakes in application. In this manner then the handle 13 can be removed from its annoying and space-taking upright position even during application of the hand brakes.

In order to release the locking engagement of the hand brake, a push rod assembly is provided comprising a push rod 56 slidably mounted within the handle 13. The rod 56 includes a slot 61 through which is extended a rivet 62, the rivet 62 being secured at its ends to the framework of the handle 13. At the grip end 37 of the handle 13 is a button 64 which is integral or in contiguous contact with an adjacent end of the push rod 56. By raising the handle 13 just slightly beyond the point where the shoulder 57 abuts the stop member 28, the pawl 50 and teeth 19 become in loose engagement, and the button 64 can be depressed to slide the rod 56 about the rivet 62 such that a second end 65 of the rod 56 drives against the second end 55 of the pawl 50 and counters the bias due to the compression spring 54. With the button 64 still depressed, the handle 13 then can be lowered, and the return springs or forces of the brakes themselves allow the lever 25 to follow the handle 13 into the non-operating position. Return springs or other means may be provided for returning the button 64 to the non-depressed position.

It should be apparent to those skilled in the art that a variety of modifications may be made to the above-described embodiment without departing from the intended scope of the invention as set forth in the following claims.

What I claim is:

1. A hand-actuated parking brake lever assembly for mechanical linkage to and operation of a remote brake, said assembly comprising:

a ratchet plate having a sector of teeth and means for securing said plate from movement;

a lever mechanism including a brake-operating lever and a releasable brake lock, said brake-operating lever being pivotally mounted to said ratchet plate and having both a stop member and a means for mechanical linkage to such remote brake whereby such remote brake is applied when said lever is pivoted in an operating direction, and said releasable brake lock comprising a pawl pivotally mounted to said lever mechanism and adjacent said sector of teeth and means supported by said lever mechanism for biasing said pawl into engagement with said sector of teeth when said lever is pivoted in an operating direction whereby said pawl maintains the braking force until disengaged;

a handle pivotally mounted to said ratchet plate and including a drive member adapted to abut and drive said stop member when said handle is pivoted in an operating direction thereby simultaneously pivoting said lever and selectively engaging said pawl with said sector of teeth, said handle being returnable to a non-operating position without disengaging said pawl from said sector of teeth; and means for disengaging said pawl from said sector of teeth thereby releasing said brake lock.

2. A parking brake lever assembly, as defined in claim 1, said assembly further including switch means for indicating that said lever mechanism is in a brake-applying position.

3. A parking brake lever assembly, as defined in claim 1, said pawl having first and second ends and being pivotally mounted between said ends, and said biasing means comprising a spring in contiguous contact with said pawl first end.

4. A parking brake lever assembly, as defined in claim 3, said disengaging means comprising a rod coextensive with and in sliding relationship within said handle and having first and second ends, a button adjacent said rod first end and protruding from a grip end of said handle, said rod second end lying adjacent said pawl second end when said handle drive member abuts said lever stop member whereby depressing said button slides said rod toward said pawl second end and pivots said pawl thereby disengaging said pawl and sector and allowing said lever to retract to a non-braking position.

* * * * *